United States Patent [19]

Casey

[11] 4,398,583

[45] Aug. 16, 1983

[54] TIRE AND METHOD OF APPLYING SEALANT

[75] Inventor: William R. Casey, Akron, Ohio

[73] Assignee: The Goodyear Tire & Rubber Company, Akron, Ohio

[21] Appl. No.: 323,934

[22] Filed: Nov. 23, 1981

[51] Int. Cl.³ .................... B60C 19/12; B60C 21/08; B32B 31/00; G01M 1/00

[52] U.S. Cl. .................................. 152/347; 156/75; 156/115

[58] Field of Search ............... 156/75, 110 R, 115, 156/117, 130, 397, 408, 405 R, 405.1; 152/330 R, 346–349

[56] References Cited

U.S. PATENT DOCUMENTS

| | | | |
|---|---|---|---|
| 3,251,722 | 5/1966 | Holman | 156/130 |
| 3,981,342 | 9/1976 | Farber et al. | 152/347 |
| 4,101,494 | 7/1978 | Kent et al. | 152/347 |
| 4,115,172 | 9/1978 | Baboff et al. | 152/347 |

Primary Examiner—Edward C. Kimlin
Assistant Examiner—Lois E. Boland
Attorney, Agent, or Firm—Frederick J. Lacher; T. P. Lewandowski

[57] ABSTRACT

A continuous strip of puncture sealing material is applied to an inside surface of a tire by laying and adhering a plurality of side-by-side turns of the strip with the different turns connected by angular crossing portions in the area of a first circumferential position of the tire. The first crossing portion overlaps a first end of the first turn. The other end of the strip is tapered and overlaps the last crossing portion and a portion of the last turn of the strip. The first circumferential position of the tire may be at a light spot circumferentially of the tire for improved balance of the tire. By overlapping the edge of the strip and pressing the material against the tire surface, the resulting puncture sealing layer is continuous and completely covers the surface of the tire under the crown portion for protection against punctures due to nails and other sharp objects.

16 Claims, 8 Drawing Figures

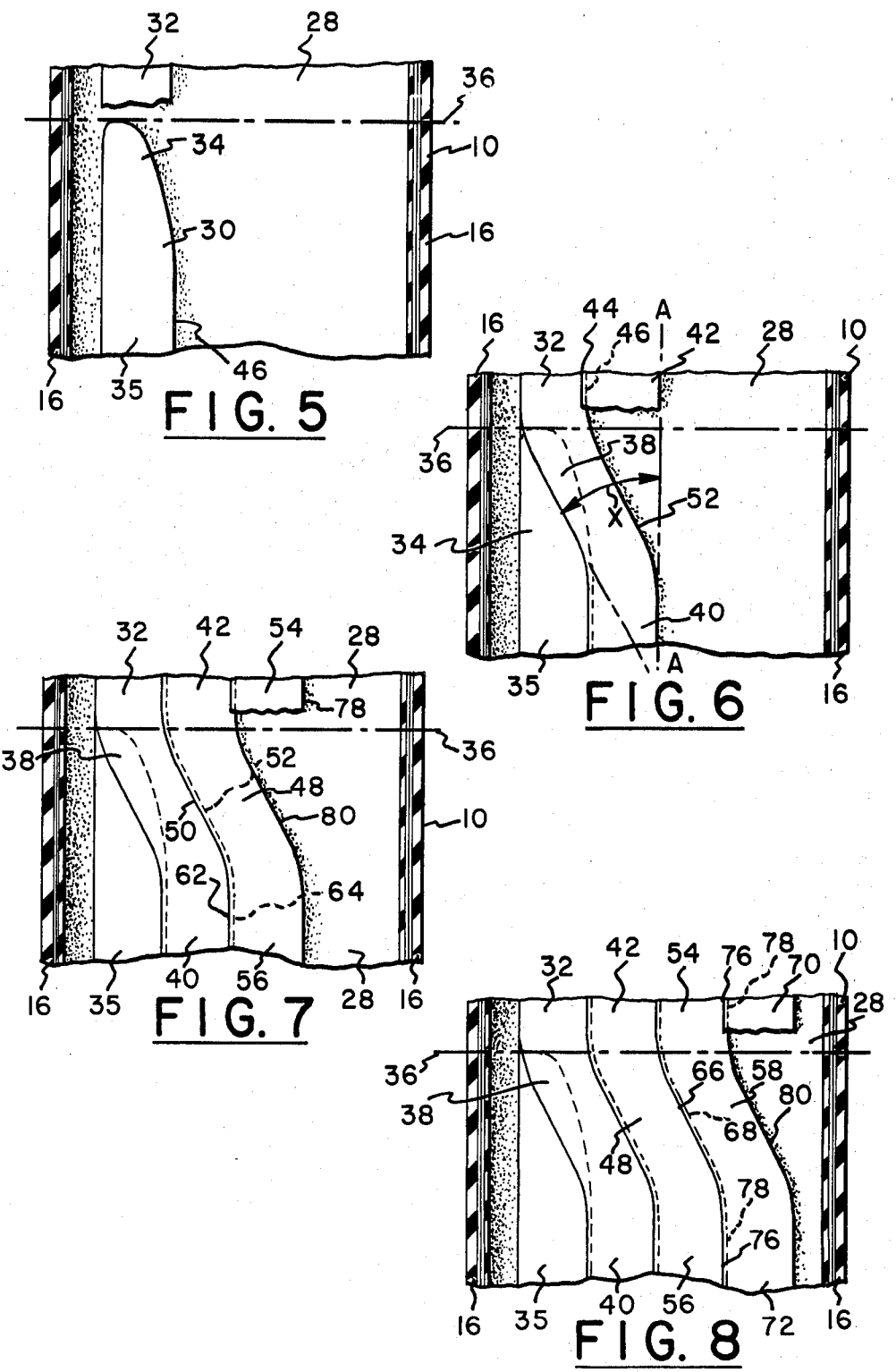

TIRE AND METHOD OF APPLYING SEALANT

It has been proposed to apply a puncture-proof layer of sealant to the inside surface of a tire crown portion by adhering strips of the sealant to the tire. When a continuous strip is extruded it has been applied in a spiral configuration. Although this method has been satisfactory for some tires, there have been problems with static and dynamic balance on other tires.

Alternatively separate strips have been applied in side-by-side relationship and the ends overlapped; however, with this method there are production problems in cutting the strips to length. Furthermore the overlapped ends create heavy spots in the strips requiring special procedures to prevent static and dynamic imbalance.

The present invention is directed to a tire and method of providing a tire with a puncture sealing layer made from a continuous strip of sealant material. The strip is laid circumferentially around the inside surface of the tire crown portion with consecutive turns in side-by-side relationship across the crown portion. After application of at least one turn of the strip in a first axial location, the strip is laid in an angular direction across another portion of the strip and then a second turn is laid circumferentially in a second axial location in side-by-side relationship with the strip in the first axial location. The adjoining edges of the strip may be overlapped providing a heavier edge portion. After the second turn, the strip is laid in an angular axial direction and then circumferentially in a third axial location. Also the end of the strip in the last axial location may be tapered and extend over another portion of the strip in that last axial location. It has been found that tires with this puncture sealing layer construction have acceptable static and dynamic balance even though the layer is made from a continuous strip and therefore can be produced economically and with precision.

In accordance with one aspect of the invention, there is provided a pneumatic tire rotatable about an axis and having an annular body of resilient rubberlike material with a pair of bead portions, a crown portion and sidewalls between the bead portions and the crown portion, a puncture sealing layer underlying the crown portion and comprising a continuous strip of puncture sealing material adhered to an inside surface of the crown portion, a first turn of the strip being laid and adhered circumferentially of the tire in an annular configuration at a first axial location, a first crossing portion of the strip extending generally angularly to a circumferential centerline of the tire across the strip to a second location in side-by-side relation with the strip in the first location, at least a second turn of the strip laid and adhered circumferentially of the tire to the inside surface in an annular configuration at the second axial location.

In accordance with another aspect of the invention, there is provided a method of applying a puncture sealing layer to an underside of a pneumatic tire rotatable about an axis and having a toroidal shape with sidewalls extending between a pair of annular bead portions and a crown portion comprising laying and adhering a first end of a continuous strip of puncture sealing material to an inside surface of the tire at a first circumferential position on the tire, laying and adhering at least a first turn of the strip circumferentially of the tire in an annular configuration at a first axial location, laying and adhering a first crossing portion of the strip extending generally angularly of a circumferentially centerline of the tire across the strip in the first axial location to a second axial location in side-by-side relation with the strip in the first axial location and then laying and adhering at least a second turn of the strip circumferentially of the tire in an annular configuration at the second axial location.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

Figure 3:
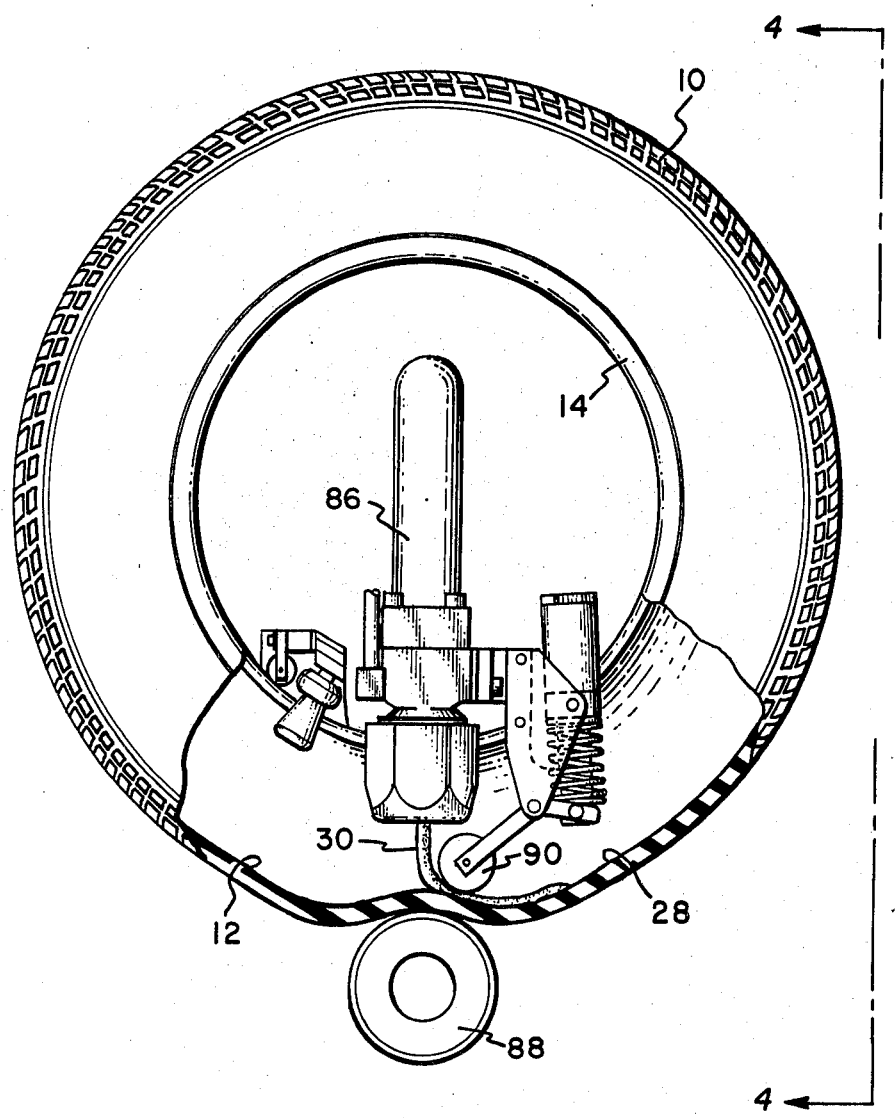
FIG. 3 is a side elevation of the tire mounted on the sealant applying apparatus with parts being broken away to illustrate the application of the sealant strip to the inside surface of the tire.
Figure 4:
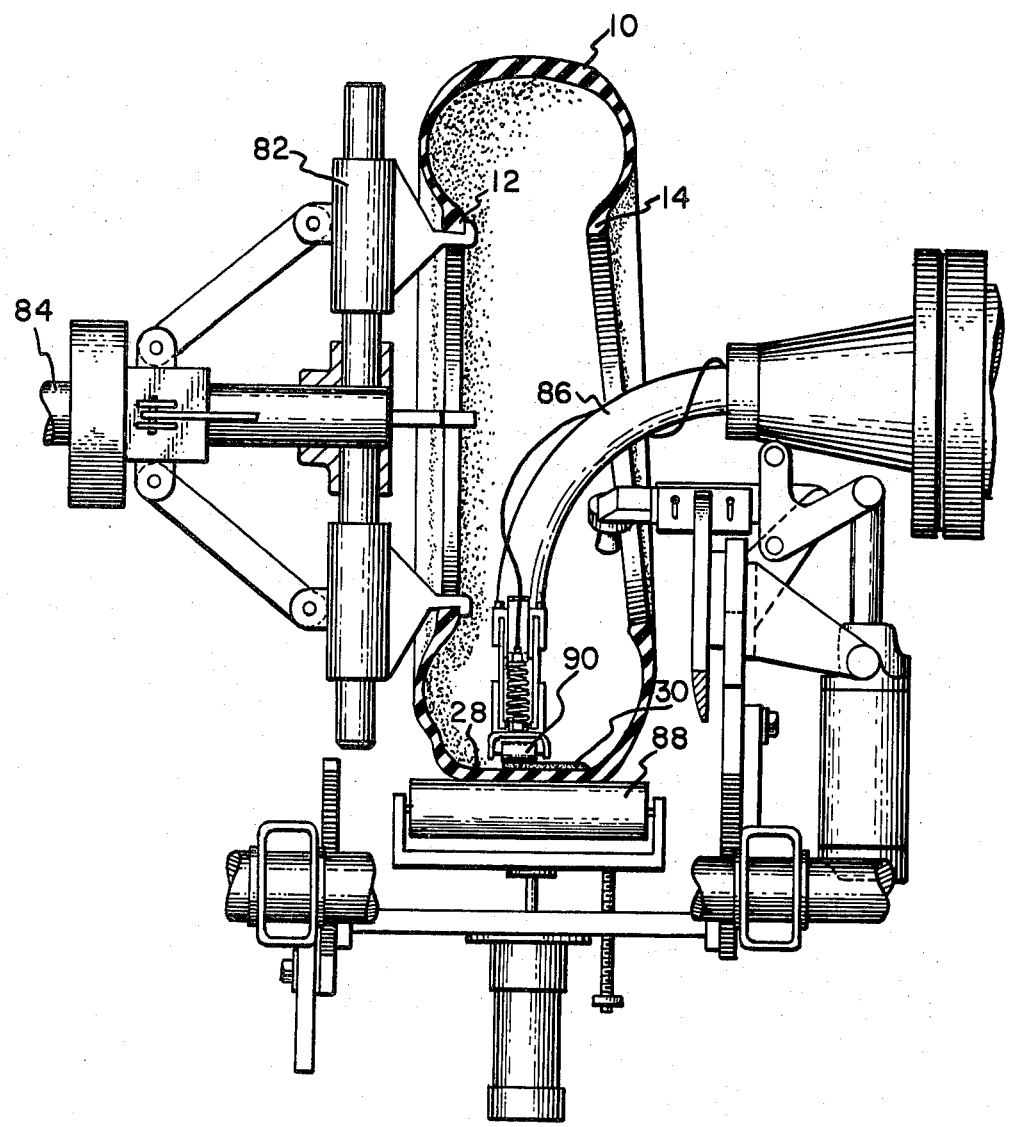

FIG. 4. is a view taken along the line 4—4 of FIG. 3 with the tire shown in section to further illustrate the application of the sealant strip to the inside surface of the tire.

Figure 2:
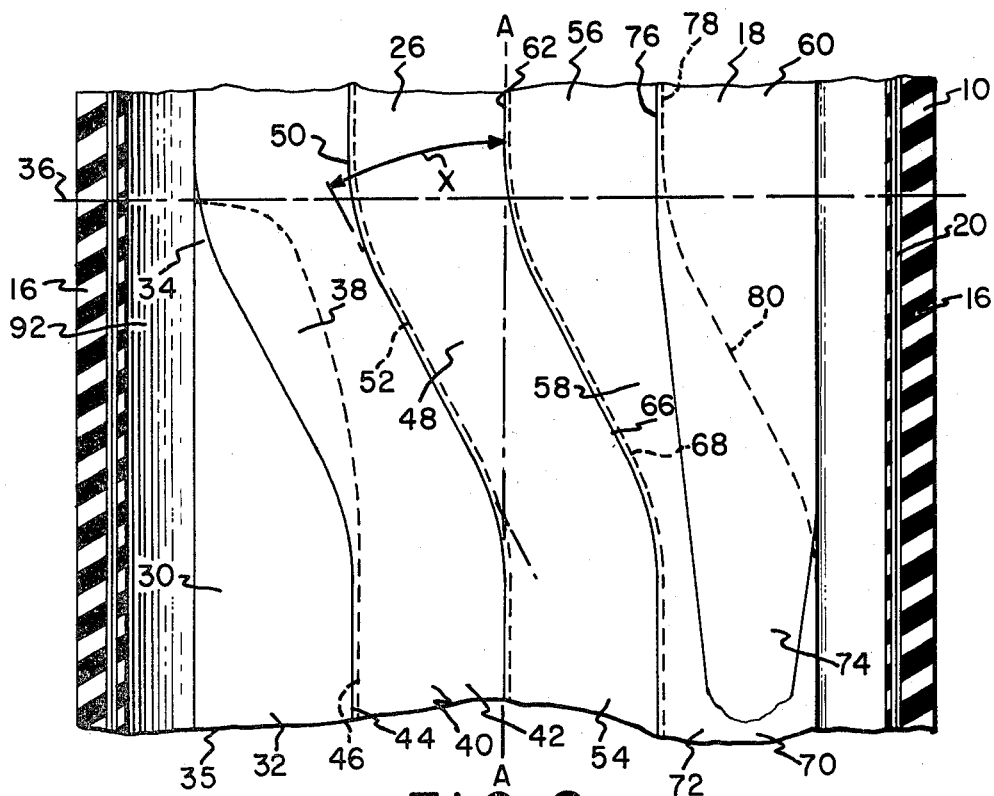
FIG. 2 is a fragmentary view taken along the line 2—2 in FIG. 1.

FIGS. 5, 6, 7 and 8 are views like FIG. 2 on a smaller scale showing the steps in applying the sealant strip to the inside surface of the tire.

Figure 1:
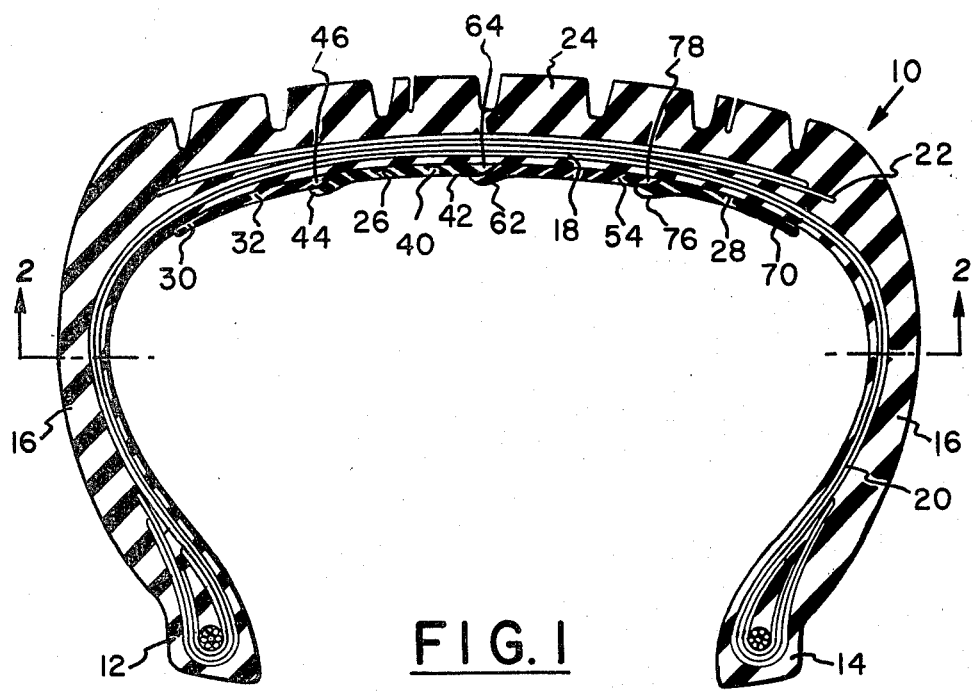
FIG. 1 is a cross-sectional view of a tire built in accordance with this invention.

Referring to FIGS. 1 and 2, a pneumatic tire 10 is shown which is suitable for mounting on a rim and rotatable about an axis. The tire 10 has an annular body of resilient rubberlike material extending between a pair of bead portions 12 and 14 and includes sidewalls 16 and a crown portion 18. The tire 10 may also be reinforced by reinforcing plies 20 extending from bead portion 12 to bead portion 14 and belt plies 22 extending generally circumferentially of the tire beneath a tread portion 24.

A puncture sealing layer 26 embodying the invention is adhered to an inside surface 28 of the tire underlying the crown portion 18. The puncture sealing layer 26 is made from a continuous strip 30 of sealant material laid on the inside surface 28 and adhered thereto in the configuration illustrated in FIGS. 1 and 2. A first turn 32 of the strip 30 is applied to the inside surface 28 starting with a first end portion 34 in a first axial location 35 at a circumferential first position 36. The first turn 32 extends 360 degrees around the tire 10 to that first position 36 again where the first turn joins a first crossing portion 38 extending angularly to a circumferential centerline A—A to a second axial location 40 where the first crossing portion is connected to a second turn 42 of the strip 30. The first crossing portion 38 may be at an angle X of from about 25 degrees to about 45 degrees to the circumferential centerline A—A of the tire 10 as shown in FIG. 2. The puncture sealing layer 26 may be of a tacky rubberlike material which is extruded or otherwise applied to the inside surface 28 and may have a thickness of from about 0.135 inches (0.343 cm) to about 0.150 inches (0.381 cm). It is understood that the thickness and composition of the material in the puncture sealing layer 26 is determined by the characteristics required for adhering to a nail driven through the tread 24 and crown portion 18 so that upon removal of the nail the material of the puncture sealing layer will be pulled into the hole made by the nail and sealed against the loss of air from the tire 10.

The second turn 42 of the strip 30 is adhered to the inside surface 28 of the tire 10 and extends circumferentially of the tire in an annular configuration at the second axial location 40 with an edge 44 of the second turn overlapping an edge 46 of the first turn 32 to completely cover the inside surface. At the first position 36 a second crossing portion 48 extends angularly across the inside surface 28 at generally the same angle X of the first crossing portion 38 relative to the circumferential centerline A—A of the tire 10. As shown in FIG. 2, an edge 50 of the second crossing portion 48 overlaps an edge 52 of the first crossing portion 38.

A third turn 54 of the strip 30 is connected to the second crossing portion 48 and extends circumferentially of the tire 10 in an annular configuration at a third axial location 56. The third turn 54 is connected to a third crossing portion 58 and at the first position 36, like the first crossing portion 38 and second crossing portion 48, is positioned angularly at an angle X relative to the circumferential centerline A—A. As shown, an edge 62 of the third turn 54 overlaps an edge 64 of the second turn 42. This overlapping continues in the third crossing portion 58 where an edge 66 of the third crossing portion overlaps an edge 68 of the second crossing portion 48.

The third crossing portion 58 is connected to a fourth turn 70 at a fourth axial location 72 and extends circumferentially of the tire 10 in an annular configuration. The fourth turn 70 extends approximately 360 degrees to a second end portion 74 of the strip 30. An edge 76 of the fourth turn 70 overlaps an edge 78 of the third turn 54. Also, as shown in FIG. 2, the second end portion 74 overlaps another edge 80 of the third crossing portion 58 and thereafter is tapered and overlaps the first part of the fourth turn 70.

Adherence of the strip 30 to the inside surface 28 of the tire 10 is provided by pressing the tacky material of the sealant against the inside surface as by a roll. Also a suitable adhesive may be applied to the inside surface 28 before application of the strip 30. The pressing of the strip 30 against the inside surface 28 serves to press the overlapping edges of the strip together and provide an uninterrupted continuous surface of the puncture sealing layer 26.

With this tire construction, the thickness of the first turn 32, second turn 42, third turn 54 and fourth turn 70 of the strip 30 applied to the inside surface 28 is the same; however, the thickness of the first crossing portion 38, second crossing portion 48 and third crossing portion 58 of the strip applied to the inside surface is somewhat less than the thickness of the first through fourth turns because of the angular disposition of the crossing portions. This reduction in thickness of the strip 30 in the crossing portions is more than compensated for by the overlapped first end portion 34 of the first turn 32 and by the overlapping of the third crossing portion 58 and the fourth turn 70 by the second end portion 74. The additional weight provided by this overlapping relationship may be used to further balance the tire 10 by locating the first circumferential position 36 of the puncture sealing layer 26 at a light spot in the tire as determined by a balancing machine prior to the application of the puncture sealing layer 26. With this construction the sealant strip 30 is applied in such a manner that the inside surface 28 underlying the crown portion 18 is covered and the dynamic and static balance changes are minimal. This is especially true of the dynamic balance changes.

The tire 10 with the puncture sealing layer 26 as described hereinabove may be manufactured by first building and curing the tire carcass without the puncture sealing layer in a manner well known to those skilled in the art. After curing of the carcass of the tire 10, the inside surface 28 is cleaned as by brushing and washing to prepare the surface for adherence of the strip 30 of puncture sealing material. The strip 30 may be applied to the inside surface 28 of the tire 10 manually or with different kinds of apparatus; however, a satisfactory tire 10 has been made on apparatus shown in greater detail in patent application Ser. No. 323,935 on "Apparatus for Applying an Extruded Strip to an Inside Tire Surface" filed concurrently with this application. Part of this apparatus is shown in FIGS. 3 and 4 to help illustrate the process of applying the puncture sealing layer 26 to the inside surface 28 of the tire 10.

After the inside surface 28 of the tire 10 has been cleaned the tire is mounted on a chuck 82 rotatable on a spindle 84. An extruded nozzle 86 is positioned within the tire 10 for extruding the strip 30 of sealant material and depositing the strip on the inside surface of the tire. A backup roller 88 may be provided to flatten the inside surface 28 and an application roll 90 may be provided to press the strip 30 against the inside surface of the tire 10. The spindle 84 is supported on a frame which is movable axially of the tire 10 after the first turn 32, second turn 42 and third turn 54 are applied to provide the first crossing portion 38, second crossing portion 48 and third crossing portion 58. After the fourth turn 70 the extruder is stopped while the tire 10 continues to be rotated to provide the tapered second end portion 74.

The strip sealant material is extruded at a constant rate and therefore the thickness of the strip 30 is determined by the speed of rotation of the spindle 84. In the embodiment shown, the tire 10 on the spindle 84 is rotated 360 degrees in $1\frac{1}{2}$ minutes. With the rate of extrusion the sealant thickness is from about 0.135 inches (0.343 cm) to about 0.150 inches (0.381 cm).

Referring further to FIGS. 5 through 8 and FIG. 2, FIG. 5 shows the tire 10 after the first end portion 34 has been laid on the inside surface 28 by extrusion from the extruder nozzle 86 positioned in the first axial location 35 of the tire. The tire 10 is rotated from the first position 36 approximately 360 degrees to provide the first turn 32 of the puncture sealing layer 26. Preferably the sealant material has sufficient tack to adhere to the inside surface 28 when pressed against the surface by the application roll 90, shown in FIGS. 3 and 4.

Referring to FIG. 6, the tire 10 is shown after the first turn 32 has been completed and the spindle 84 has been moved axially so that the extruder nozzle 86 is located over a second axial location 40 providing a first crossing portion 38 extending angularly to the circumferential centerline A—A of the tire. The first crossing portion 38 overlaps part of the first end portion 34 of the strip 30. Also the width of the strip 30 relative to the first axial location 35 and second axial location 40 is such that the edge 44 of the second turn 42 overlaps the edge 46 of the first turn 32. This overlapping insures that the puncture sealing layer 26 will provide complete and continuous coverage of the inside surface 28.

When the spindle 84 is rotated and the second turn 42 is completed to the first position 36, the spindle is moved axially to provide a second portion 38. The axial movement continues until the tire 10 has moved to the third axial location 56. Then upon further rotation of the spindle 84, the third turn 54 of the strip 30 is laid and adhered in side-by-side relation with the strip in the second axial location 40. Here again, the relationship of the width of the strip 30 and the third location 56 and second location 40 is such that the edge 62 of the third turn 54 overlaps the edge 64 of the second turn 42.

Referring to FIG. 8, the procedure for laying and adhering the first, second and third turns 32, 42 and 54 is repeated to lay the fourth turn 70 and the third crossing portion 58. The relationship of the width of the strip 30 to the third axial location 56 and fourth axial location 72 is such that the edge 76 of the fourth turn 70 overlaps the edge 78 of the third turn 54. Also the edge 66 of the third crossing portion 58 overlaps the edge 68 of the second crossing portion 48.

Finally, with reference to FIG. 2, the extrusion of the strip 30 from the extruder nozzle 86 is terminated at the first position 36. Then as the tire 10 continues to rotate for about three seconds, the remaining material in the nozzle 86 is extruded and pulled into the tapered end portion 74 which overlaps the edge 80 of the third crossing portion 58 and also part of the fourth turn 70.

The overlapping of the strip 30 results in additional weight of the sealant material in the fourth turn 70 which balances the additional weight in the first turn 32 due to the overlapping of the first crossing portion 38 with the first end portion 34.

This additional weight may be advantageously utilized at the beginning of the process by measuring the imbalance of the tire carcass before the puncture sealing layer 26 is applied. The results of the balancing measurement will indicate the position of a light spot 92 circumferentially of the tire 10 which can be marked on the tire. Then in accordance with this invention, the tire 10 is positioned so that the light spot 92 is adjacent the first position 36 wherein the additional weight of the puncture sealing layer 26 in this area will compensate for the light spot in the tire.

After the puncture sealing layer 26 has been applied as by the apparatus shown in FIGS. 3 and 4, the tire 10 is removed from the apparatus and is ready for use.

The tire 10 may have a puncture sealing layer 26 with two or more turns depending on the width of the crown portion 18 and the width of the strip 30. Also the width of the strip 30 can be increased or decreased by changing the die opening in the extruder nozzle 86. The axial positioning of the turns may then be adjusted in a corresponding amount to provide the overlapping edges of the adjacent crossing portion and the adjacent turns.

While certain representative embodiments and details have been shown for the purpose of illustrating the invention, it will be apparent to those skilled in the art that various changes and modifications may be made therein without departing from the spirit or scope of the invention.

What is claimed is:

1. A pneumatic tire rotatable about an axis and having an annular body of resilient rubberlike material with a pair of bead portions, a crown portion and sidewalls between said bead portions and said crown portion, a puncture sealing layer underlying said crown portion and comprising a continuous strip of puncture sealing material adhered to an inside surface of said crown portion, a first end portion positioned at a first axial location, a first turn of said continuous strip being laid and adhered circumferentially of said tire in an annular configuration at said first axial location and overlapping said first end portion, a first crossing portion of said continuous strip extending generally angularly to a circumferential centerline of said tire across said continuous strip to a second axial location in side-by-side relation with said continuous strip in said first axial location, at least a second turn of said continuous strip laid and adhered circumferentially of said tire to said inside surface in an annular configuration at said second axial location and an end portion of a last turn of said continuous strip overlapping a part of said last turn providing additional weight in said last turn for balancing the additional weight in said first turn due to the overlapping of said first end portion.

2. A pneumatic tire in accordance with claim 1 wherein said first end of said continuous strip is positioned at a relatively light spot measured circumferentially of said tire and said crossing portion is positioned at said light spot to improve the balance of the tire.

3. A pneumatic tire in accordance with claim 1 wherein an edge of said second turn overlaps an edge of said first turn for continuous coverage of said inside surface of said crown portion.

4. A pneumatic tire in accordance with claim 1 wherein a second crossing portion of said continous strip extends generally angularly to said circumferential centerline across said continous strip to a third axial location in side-by-side relation with said continuous strip in said second axial location and at least a third turn of said continuous strip laid and adhered circumferentially of said tire to said inside surface in an annular configuration at said third axial location.

5. A pneumatic tire in accordance with claim 4 wherein an edge of said second turn overlaps an edge of said first turn, an edge of said second crossing portion overlaps an edge of said first crossing portion and an edge of said third turn overlaps an edge of said second turn.

6. A pneumatic tire in accordance with claim 1 wherein said end portion of said last turn of said continuous strip has a tapered configuration.

7. A pneumatic tire in accordance with claim 3 wherein said layer is compressed as by rolling to provide a smooth continuous surface at the portion of said tire underlying said crown portion.

8. A pneumatic tire in accordance with claim 1 wherein said first crossing portion is at an angle of from about 25 degrees to about 45 degrees relative to said circumferential centerline of said tire.

9. A pneumatic tire in accordance with claim 1 wherein said continuous strip of puncture sealing material has a thickness of from about 0.135 inches to 0.150 inches.

10. A method of applying a puncture sealing layer to an underside of a pneumatic tire rotatable about an axis and having a toroidal shape with sidewalls extending between a pair of annular bead portions and a crown portion comprising layer and adhering a first end of a continuous strip of puncture sealing material to an inside surface of said tire at a first circumferential position on said tire, laying and adhering at least a first turn of said continuous strip circumferentially of said tire in an annular configuration at a first axial location, overlapping said first end portion at said first axial location, laying and adhering a first crossing portion of said continuous strip extending generally angularly of a circumferential centerline of said tire across said continuous strip in said first axial location to a second axial location in side-by-side relation with said continuous strip in said first axial location, laying and adhering at least a second turn of said continuous strip circumferentially of said tire in an annular configuration at said second axial location and then overlapping a part of a last turn of said continuous strip with an end portion of said last turn providing additional weight in said last turn for balancing the additional weight in said first turn due to the overlapping of said first end portion.

11. The method of claim 10 further comprising laying and adhering said first end of said continuous strip at a light spot measured circumferentially of said tire so that said first crossing portion will be located at said light spot.

12. The method of claim 10 further comprising laying and adhering said second turn with an edge overlapping an edge of said first turn for continuous coverage of said inside surface.

13. The method of claim 10 further comprising laying and adhering a second crossing portion in the same generally angular direction as said continuous first crossing portion and at said first circumferential position, and laying and adhering a third turn connected to said second crossing portion in a third axial location in side-by-side relation with said strip in said second axial location.

14. The method of claim 10 further comprising laying and adhering said second turn in a position on said inside surface with an edge of said second turn overlapping an edge of said first turn.

15. The method of claim 10 further comprising extruding said continuous strip and terminating said extrusion at said first position while providing rotation of said tire relative to an extruder die providing a taper at said end portion of said last turn.

16. The method of claim 10 further comprising pressing said continuous strip against said inside surface with a roller after it is laid on said inside surface.

* * * * *

UNITED STATES PATENT OFFICE
CERTIFICATE OF CORRECTION

Patent No. 4,398,583              Dated August 16, 1983

Inventor(s) William R. Casey

It is certified that error appears in the above-identified patent and that said Letters Patent are hereby corrected as shown below:

Column 2, line 2, "circumferentially" should read --circumferential--.

Column 6, line 57, "layer" should read --laying--.

Signed and Sealed this

Sixth Day of December 1983

[SEAL]

Attest:

Attesting Officer

GERALD J. MOSSINGHOFF
Commissioner of Patents and Trademarks